United States Patent [19]
Marshall, Sr.

[11] Patent Number: 4,961,607
[45] Date of Patent: Oct. 9, 1990

[54] VEHICLE CABINET

[76] Inventor: William M. Marshall, Sr., 1050 Givens-Tyler Rd., Salem, Va. 24153

[21] Appl. No.: 367,864

[22] Filed: Jun. 19, 1989

[51] Int. Cl.⁵ .............................................. B60P 3/03
[52] U.S. Cl. .................................. 296/156; 296/24.1; 296/37.8; 296/164; 312/235.3
[58] Field of Search ...................... 296/24.1, 156, 164, 296/168, 37.8; 312/235.3

[56] References Cited
U.S. PATENT DOCUMENTS

| | | |
|---|---|---|
| 2,024,045 | 12/1935 | Johnson .............................. 312/235.3 |
| 2,743,955 | 5/1956 | Wilson ................................. 296/156 |
| 3,441,101 | 4/1969 | Parnell ................................. 296/156 |
| 4,550,946 | 11/1985 | Hanemaayer ....................... 296/156 |
| 4,728,144 | 3/1988 | Crean .................................. 296/168 |

Primary Examiner—Robert R. Song
Attorney, Agent, or Firm—John F. C. Glenn

[57] ABSTRACT

A recreation vehicle cabinet has a table leaf extensible across the center aisle and a pair of seats swingable about the front corner posts of the cabinet into and out of the cabinet interior.

15 Claims, 11 Drawing Sheets

VEHICLE CABINET

BACKGROUND OF THE INVENTION

A widely used recreational vehicle has a pair of side by side seats at the front for the driver and passenger, a double bed across the rear, and an access aisle therebetween. The spaces along the aisle are needed for a seat behind the driver, a stair to a side door, and equipment for storage, washing, cooking and refrigeration. Consequently, the table and seats for dining and the bed are usually constructed so that the bed can be moved aside to make room for the dining facilities, and vice versa. Such unavoidable movement back and forth is a nuisance which detracts from the relaxed enjoyment of recreation in the vehicle.

SUMMARY OF THE INVENTION

The present invention provides a convertible cabinet which is so compact as to require minimum space where it is mounted, but which can be opened out to provide extended table surface and seats in a position suitable for sitting at the table. It is particularly useful when mounted immediately behind the front passenger seat of a recreational vehicle, and immediately in front of the stair leading to the side door of the vehicle. In that position, the cabinet is out of the way while retracted, and uses the adjacent aisle space to make room for the extended table and seats when the cabinet is opened up. Since this position is well away from the bed in the rear of the vehicle, there is no need to disturb the bed when it is desired to use the dining facilities.

The present preferred embodiment of the invention has a pair of seats which swing out from a cavity in the central portion of the cabinet, and has a table leaf which rests on top of the cabinet while retracted but swings out over the position of the seats when extended. Storage compartments are provided in the cabinet above and below the space occupied by the retracted seats.

Other advantages, objects and details of the invention will become apparent as the following detailed disclosure proceeds.

BRIEF DESCRIPTION OF THE DRAWINGS

Present preferred embodiments of the invention are shown, for purposes of illustration only, in the accompanying drawings, in which.

DETAILED DESCRIPTION OF THE PREFERRED EMBODIMENTS

Figure 1:
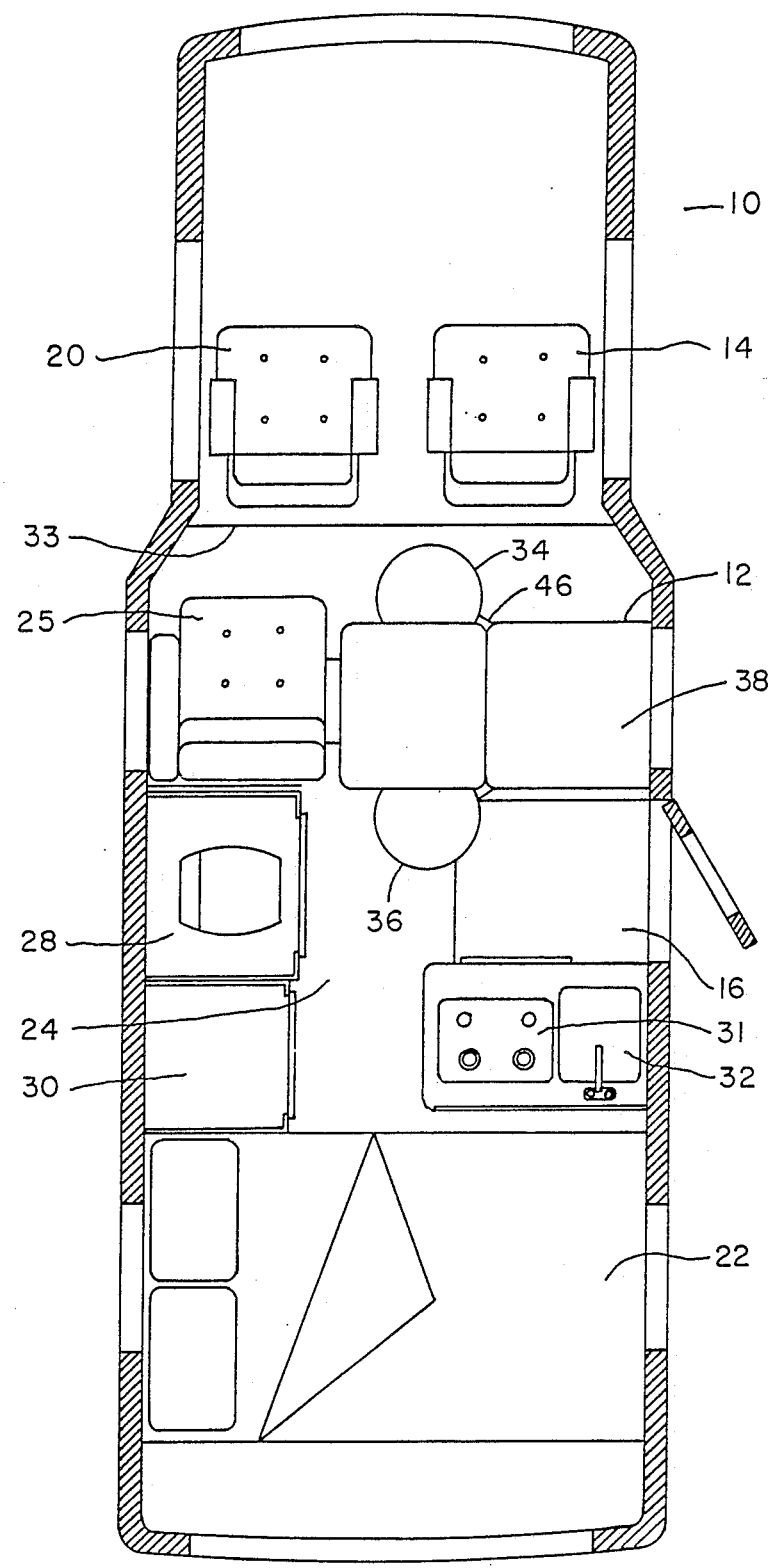
FIG. 1 shows a sectional top plan view of the interior of a recreational vehicle having a cabinet embodying the invention, with seats and main table leaf extended.

Referring now to the preferred embodiment of the invention shown in the accompanying drawings, a recreational vehicle 10 has a convertible cabinet 12 mounted between the front passenger seat 14 and a stairwell 16 leading up from the vehicle's side door 18. The driver's seat 20 is next to the front passenger seat 14. A double bed 22 extends across the rear of the vehicle, and a central aisle 24 extends between the bed 22 and seats 14 and 20. A rear passenger seat 25, toilet enclosure 28 and wardrobe 30 extend along the side of the aisle behind the driver's seat; and cabinet 12, stairwell 16 and a stove 31 and cooler 32 unit extend along the opposite side of aisle 24. The floor level is lower, by about five inches, to the rear of a step 33 behind seats 14 and 20.

Cabinet 12 has two seats 34 and 36 which may be retracted inside of it, as shown in FIGS. 1, 3, 4, and 10. A table panel 38 is secured in a fixed position across the top of cabinet 12, and a table leaf 40 covers panel 38 when the cabinet is not in use. When the seats 34 and 36 and leaf 40 are retracted, the cabinet is in a compact rectangular form presenting no obstacle to passage along aisle 24.

Figure 2:
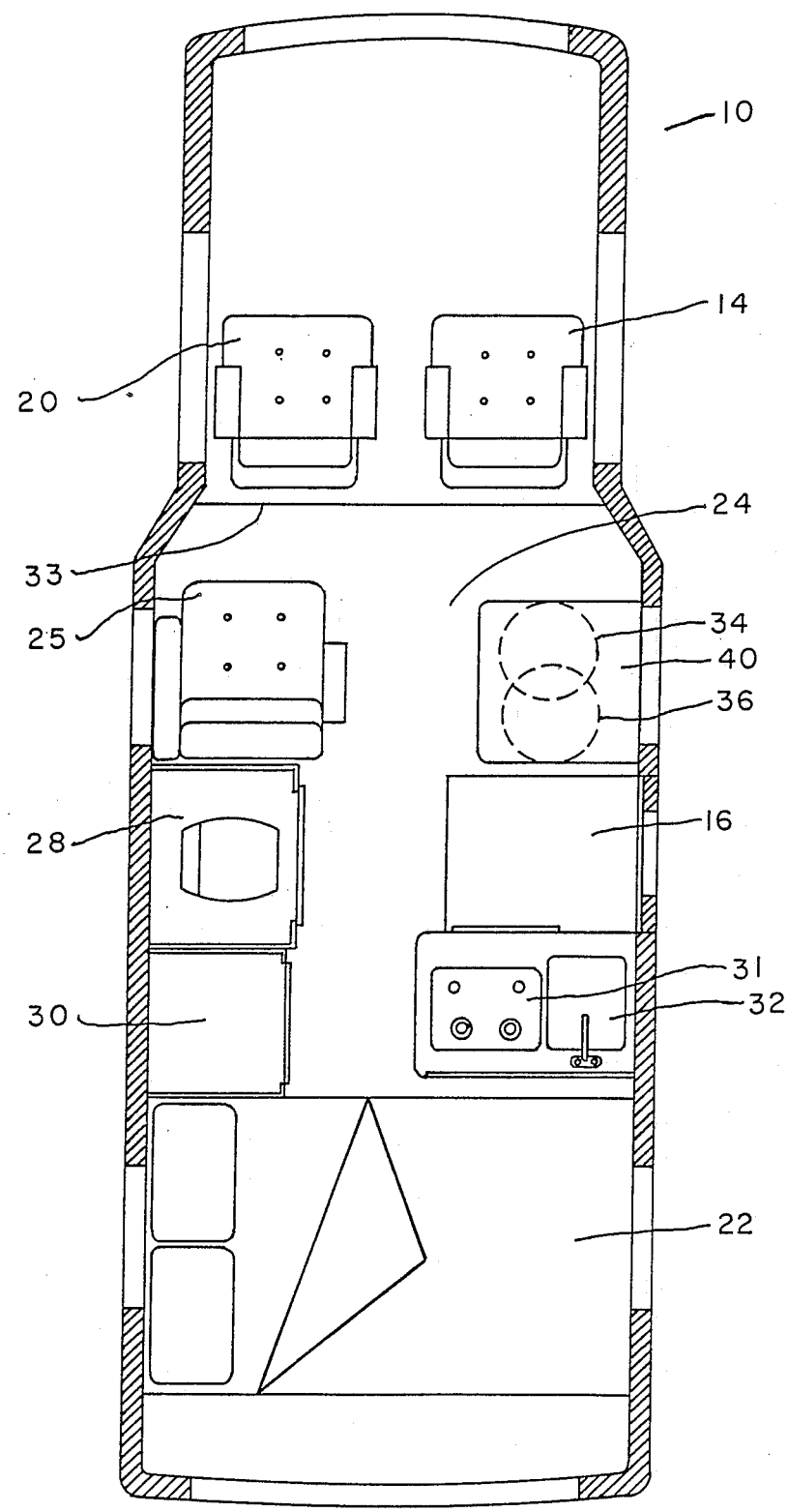
FIG. 2 corresponds to FIG. 1, but shows the cabinet in the retracted condition.
Figure 6:
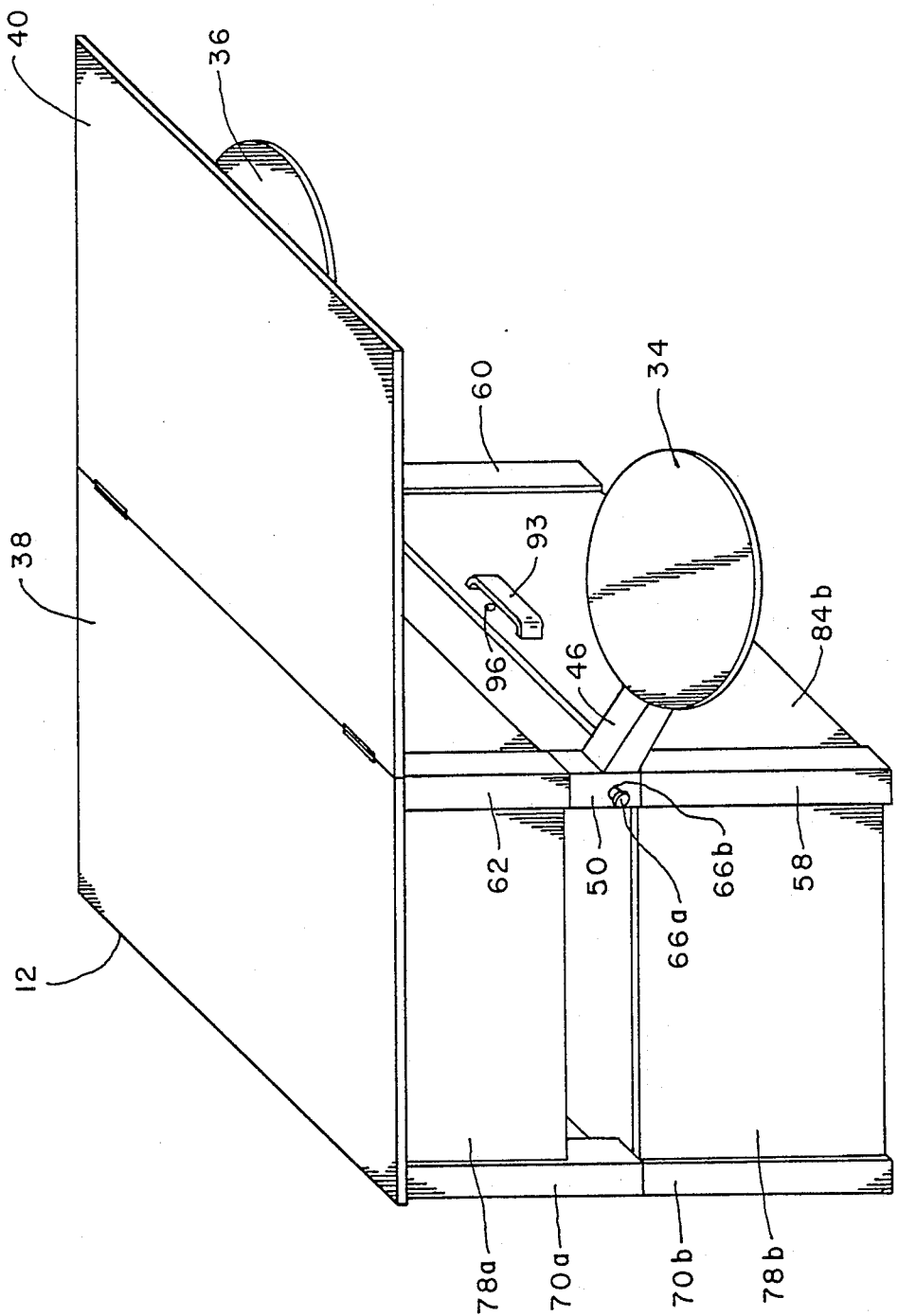
FIG. 6 corresponds to FIG. 5, but shows the extended main table leaf.

When cabinet 12 is needed for dining, writing, or the like, a supporting bracket 42 is pulled out horizontally from a position in the cabinet beneath fixed panel 38. A table leaf 40 has an edge secured by hinges 44 to the edge of panel 38 along the front of the cabinet. When leaf 40 is swung up and over on hinges 44 to rest on bracket 42, the resultant exposed upper surfaces of panel 38 and leaf 40 are flush with each other and present a substantially continuous horizontal table surface extending across the top of cabinet 12 and across aisle 24 toward seat 25 (FIGS. 2 and 6). Seats 34 and 36 are then swung out to positions beneath opposite sides of the extended leaf 40. The amount of such swinging movement of the seats is adjustable for the comfort and convenience of the person sitting down on them to dine or write on panel 38 and leaf 40.

Figure 5:
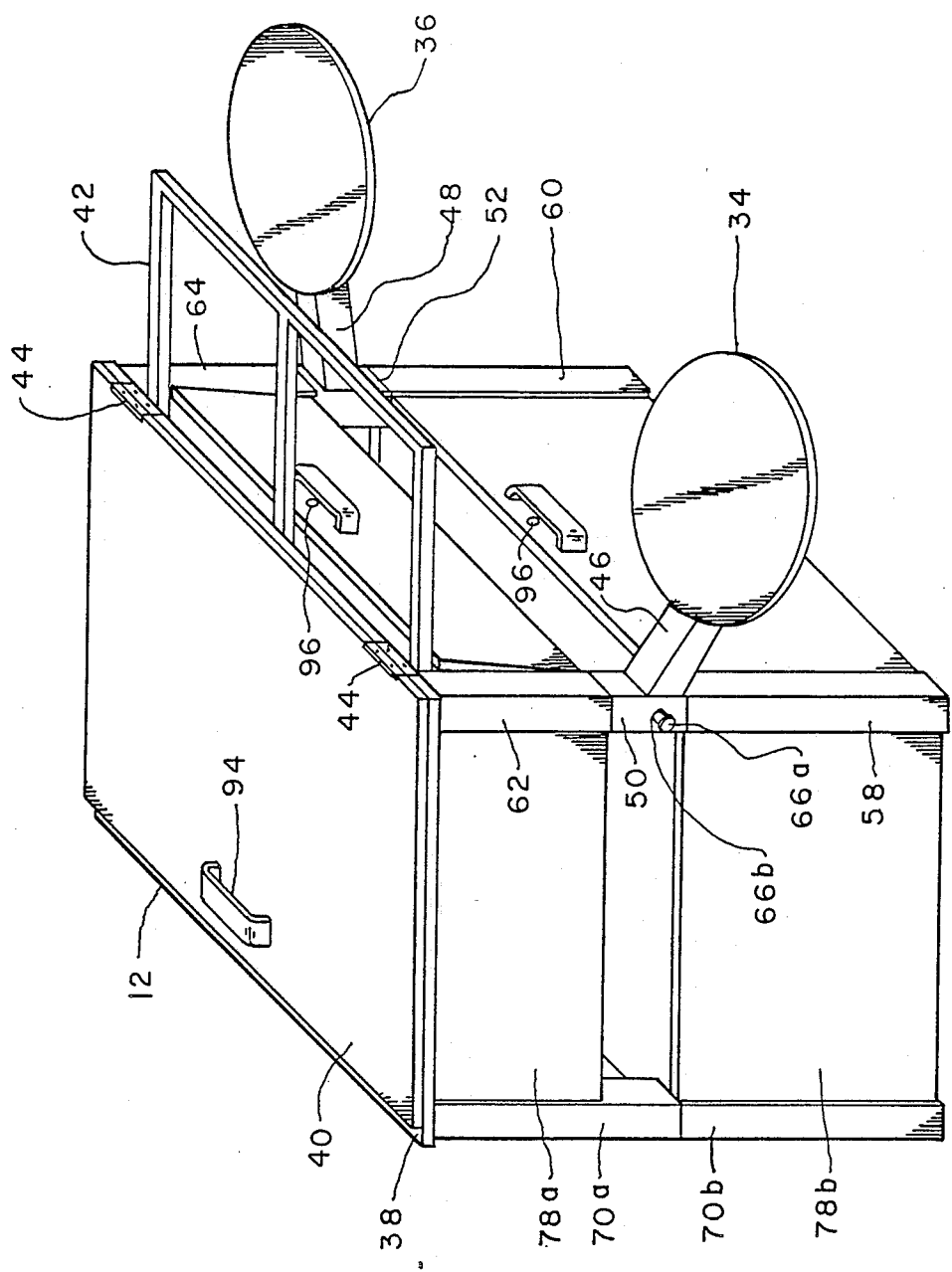
FIG. 5 corresponds to FIG. 4, but shows the seats extended and an extended support for the table leaf.

Seats 34 and 36 are supported for such swinging movement by arms 46 and 48 (FIG. 5). The arms extended horizontally from and are integral with short vertical central corner post sections 50 and 52 which fit rotatably about fixed cylindrical vertical rods 54 and 56 (FIGS. 5 and 6). The lower ends of rods 54 and 56 extend down into the upper ends of lower vertical corner post sections 58 and 60 of cabinet 12, and extend upwardly into the lower end of upper vertical corner post section 62 and 64 of cabinet 12. Rods 54 and 56 have a close fit within the upper and lower post sections, and each rod is secured to at least one of the upper or lower post sections (preferably the lower one). All of the said post sections are of the same square section, so that a continuous corner post appearance is presented when seats 34 and 36 are in their retracted positions. Spring-loaded pins 66a (FIG. 11) extend through housings 66b and 66c secured to central post sections 50 and 52, and may be inserted in openings in rods 54 and 56 in order to lock seats 34 and 36 in their retracted or extended positions during travel of vehicle 10.

Figures 7, 8:
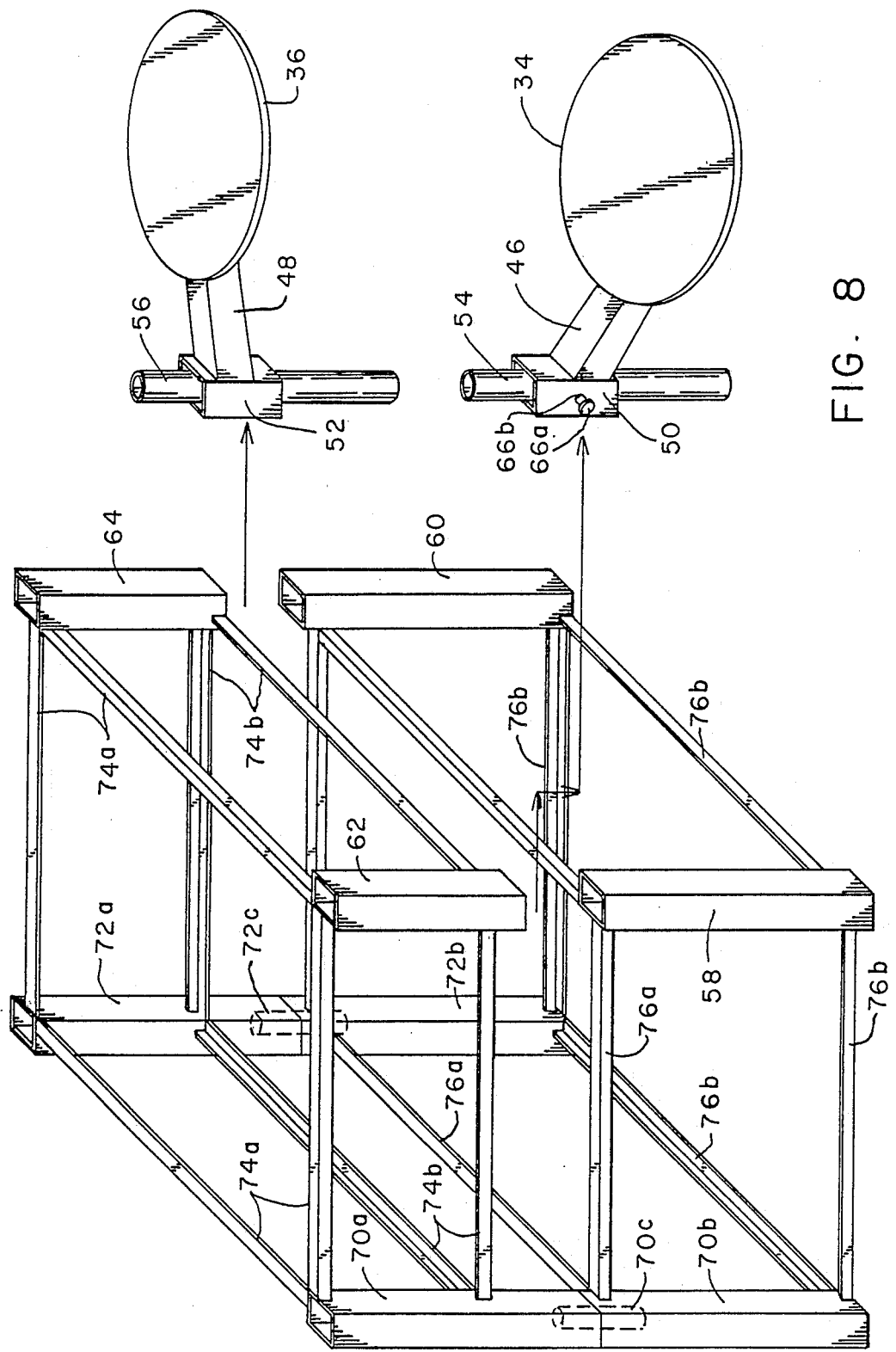
FIG. 7 shows an isometric view of framework supporting what is shown in FIG. 4, extending the seats and their supports.
FIG. 8 shows an isometric view of the seats and what connects them to the framework of FIG. 7.

As shown in FIG. 7, the rear corners of cabinet 12 are formed by upper and lower post sections 70a and 70b on one side, and 72a and 72b on the other side. Rods 70c and 72c are similar to rods 54 and 56, and fit within post section 70a and -b and 72a and -b to hold them together when cabinet 12 is fully assembled, but to permit the upper part of the cabinet, bounded by upper post sections 62, 64, 70a and 72a, to be lifted away from the lower part of the cabinet, bounded by lower post sections 58, 60, 70b and 72b. The upper part of the cabinet is held together between its post sections by upper cross members 74a and lower cross members 74b; and the lower part of the cabinet is held together between its post sections by upper cross members 76a and lower cross members 76b. When the upper part of the cabinet is so lifted away, the rods 54 and 56 remain with the post sections to which they are fastened (preferably lower post sections 58 and 60).

Figure 4:
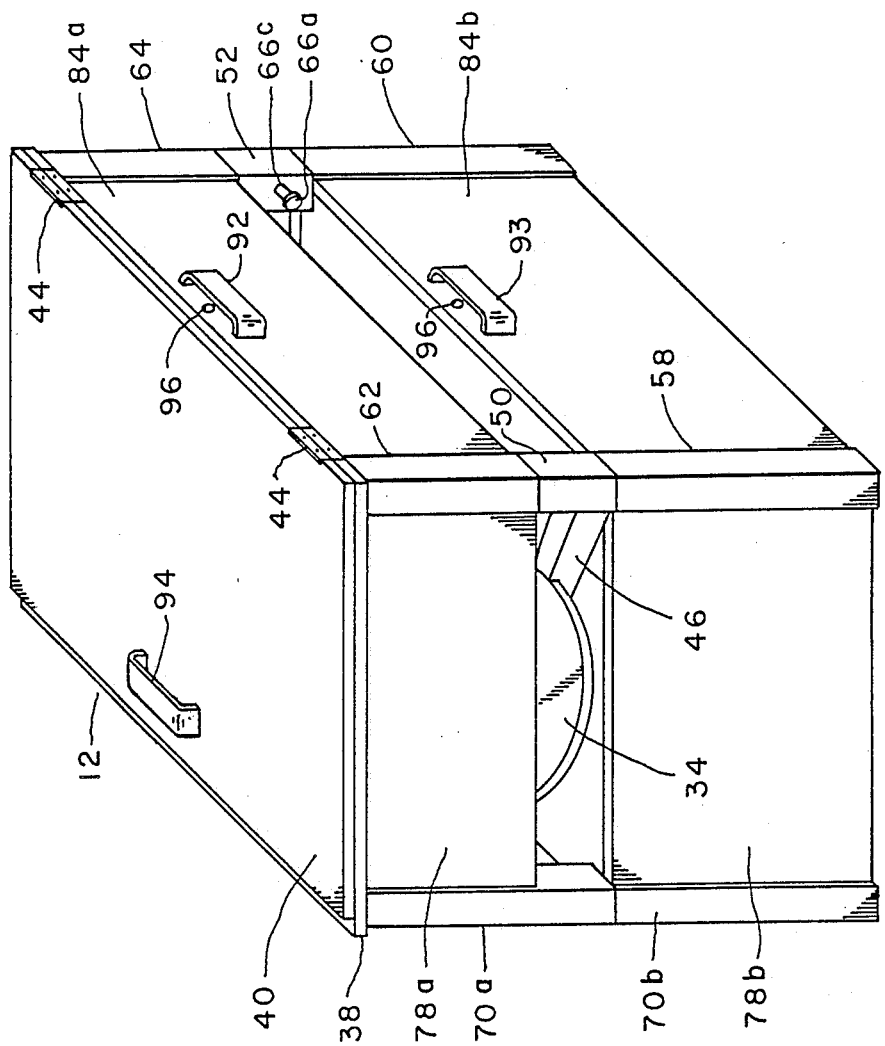
FIG. 4 shows an enlarged isometric view of the front, top and left side (as viewed from the front) of the cabinet shown in FIG. 2.
Figure 9:
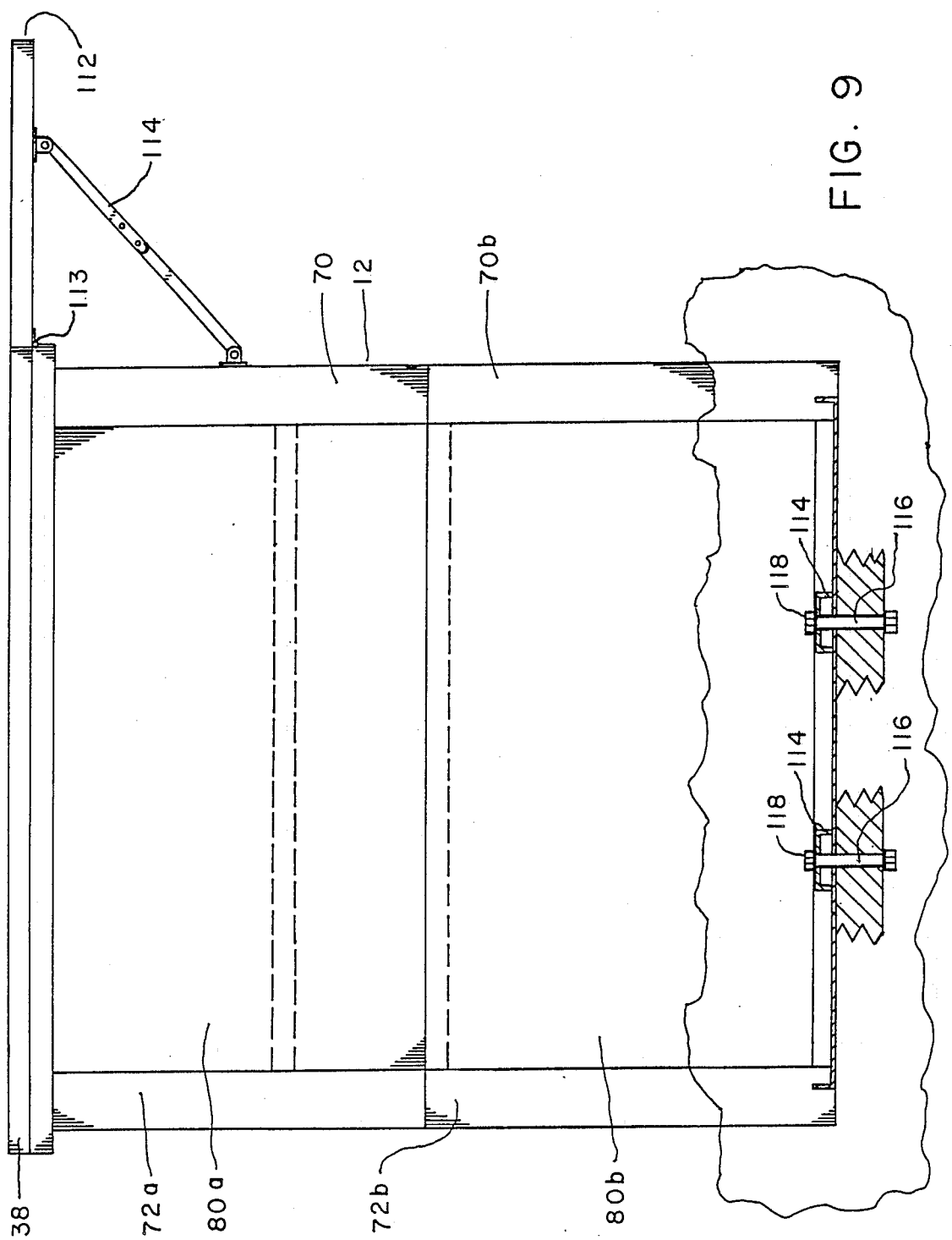
FIG. 9 shows a view of the rear of the cabinet shown in the preceding Figures, with the auxiliary leaf extended.
Figure 10:
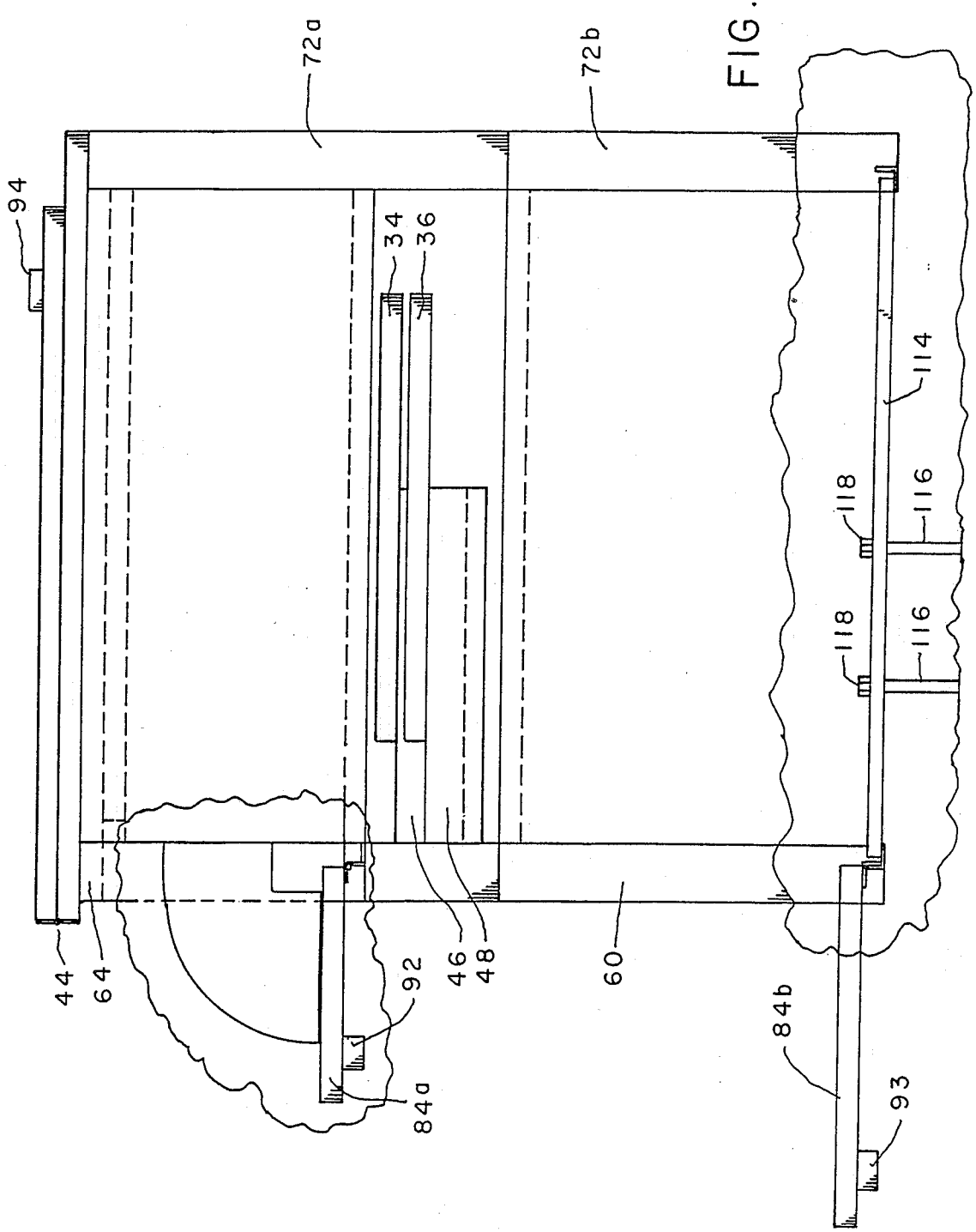
FIG. 10 shows a side view of the cabinet shown in FIG. 9, as seen from the left side of FIG. 9.

As shown in FIGS. 4, 9 and 10, an upper side panel 78a covers the areas between and is secured to the cross members 74a and -b between post sections 62 and 70a; and an opposite upper side panel 80a covers the area between and is secured to the cross members 74a and -b between post sections 64 and 72a. Spaced below panels 78a is a lower fixed side panel 78b covering the area between and secured to the cross members 76a and -b between post sections 58 and 70b and opposite to panel 78b; and spaced below panel 80a is a lower side panel 80b covering the area between and secured to post sections 60 and 72b and the cross members 76a and 76b between post sections 60 and 72b.

Across the back of the cabinet are a pair of abutting panels 82a and 82b. Panel 82a covers the area between and is secured to the cross members 74a and -b between post sections 70a and 72a; and panel 82b covers the area between and is secured to the cross members 76a and -b between post sections 70b and 72b.

At the front of the cabinet, facing the aisle, an upper access panel 84a is hinged along its bottom edge to the cross member 74b between post sections 62 and 64, to swing up to cover and down to uncover the area between upper post sections 62 and 64. Downward movement of the upper access panel 84a stops when it is horizontal, under control of a pair of brackets 77 secured to opposite sides of panel 84a and slidable against the sides of upper post sections 62 and 64 which face each other and slidably engage the sides of panel 84a. Each of the brackets 77 has an inturned flange 79 that engages the backside of the adjacent upper post section 62 or 64 when the panel 84a is horizontal, but swings away from the adjacent post section as upward movement of panel 84a swings brackets 79 into the interior of the space behind panel 84a. Such upward movement of panel 84a stops, in a vertical position, when the top of the panel 84a engages the cross member 74a between upper post sections 62 and 64.

A horizontal member 86 is secured to cross members 74b and extends to and between the bottom edges of panels 78a, 80a, 82a and 84a. It forms the floor of an upper compartment in the cabinet which is accessible through panel 86a.

A similar lower access panel 84b is hinged along its bottom edge to the cross member 76b between lower post sections 58 and 60, to swing up to cover and down to uncover the area between those post sections. Panel 84b controls access to a lower compartment bounded by panels 78b, 80b, 82b and 84b between a horizontal cover member 88 secured to and extending horizontally between cross members 76a, and a floor member 90 secured to and extending horizontally between cross members 76b. Sufficient space is left between floor 86 and cover 88 to receive seats 34 and 36 and their supporting arms 46 and 48 within the cabinet, and to provide slots for their movement into and out of the cabinet. A pair of side slots are provided between the lower edges of side panels 78a and 80a and the upper edges of side panels 78b and 80b. A front slot is provided between the lower edge of access panel 84a and the upper edge of access panel 84b. These slots prevent interference with the turning of post sections 50 and 52, and facilitate reaching into the intermediate space to push out the seats 34 and 36. As shown in FIGS. 1 and 10, the seats 34 and 36 are mounted for swinging movement in separate superimposed planes, so that they can be partially overlapped in a retracted position, to save space.

Lower access panel 84b has no brackets corresponding to brackets 79 because it is supported by the floor of vehicle 10 while in its downward position. When swung up, its upper end engages the cross member 76a between lower post sections 58 and 60.

Handles 92, 93 and 94 are secured to the exteriors of hinged panels 84a and -b, and to the exposed side of table leaf 40 in its folded back position. Arms 46 an 48 serve as convenient handles for swinging seats 34 and 36 to and from their retracted positions.

Figure 12:
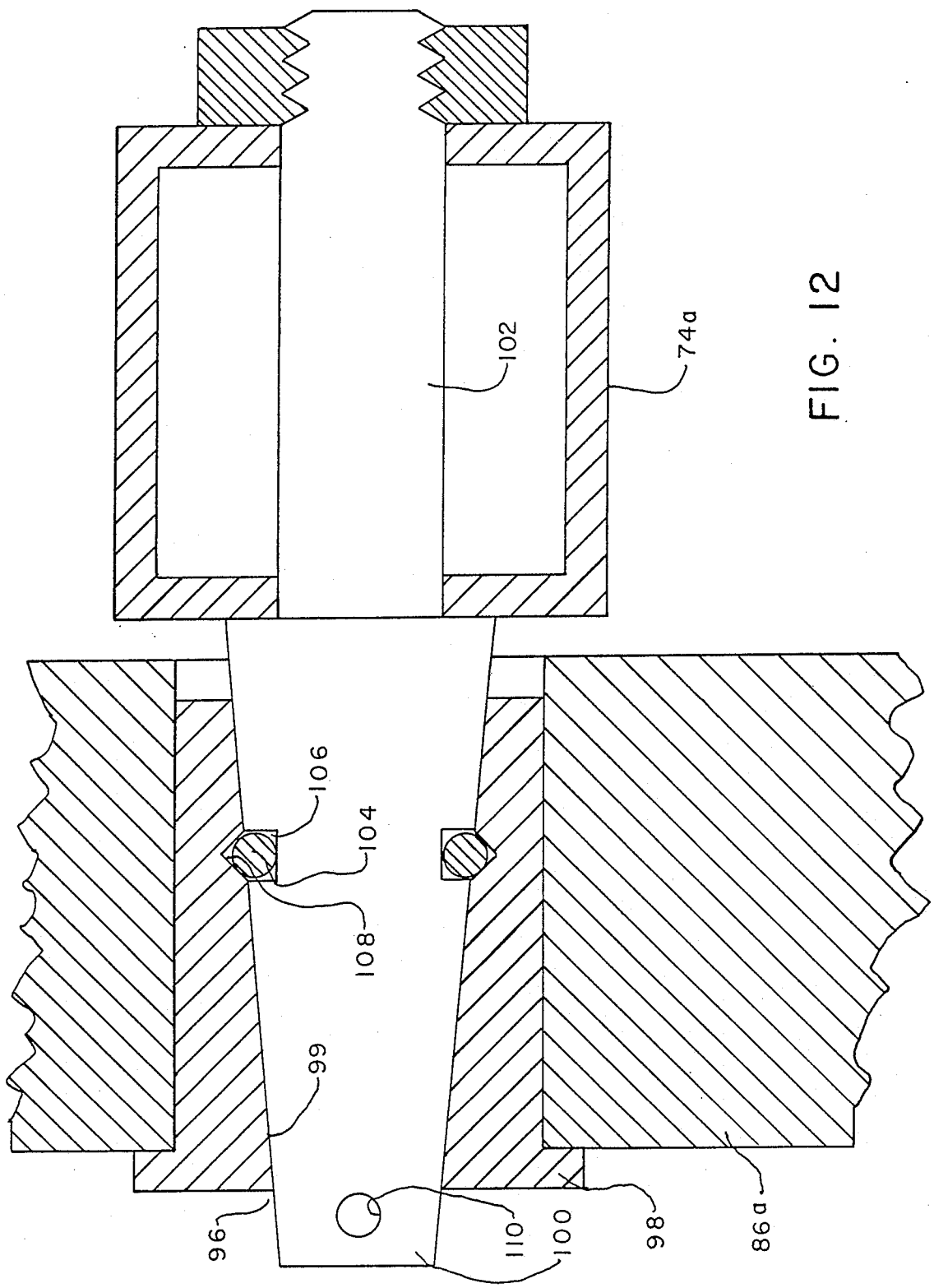
FIG. 12 shows an enlarged, broken away and partially sectional view of a retainer to hold an access panel in place on the cabinet.

Access panels 86a and 86b are held in their closed positions by retainers 96. As shown in FIG. 12 for panel 86a, the retainer has a bushing 98 secured in an opening through the panel. A conical opening 99 through the bushing receives a conical plug 100 extending from an integral cylindrical member 102 which extends through and is secured to the cross member 74a between post sections 62 and 64. A rubberlike o-ring 104 is seated in a groove 106 around plug 100 and enters a groove 108 around the inside of the conical opening 99 to hold panel 86a releasably in place when it reaches its closed position. The far end of plug 100 projects beyond bushing 98 and has a hole 110 through it to receive a locking pin to hold panel 86a securely in place during travel.

Figure 3:
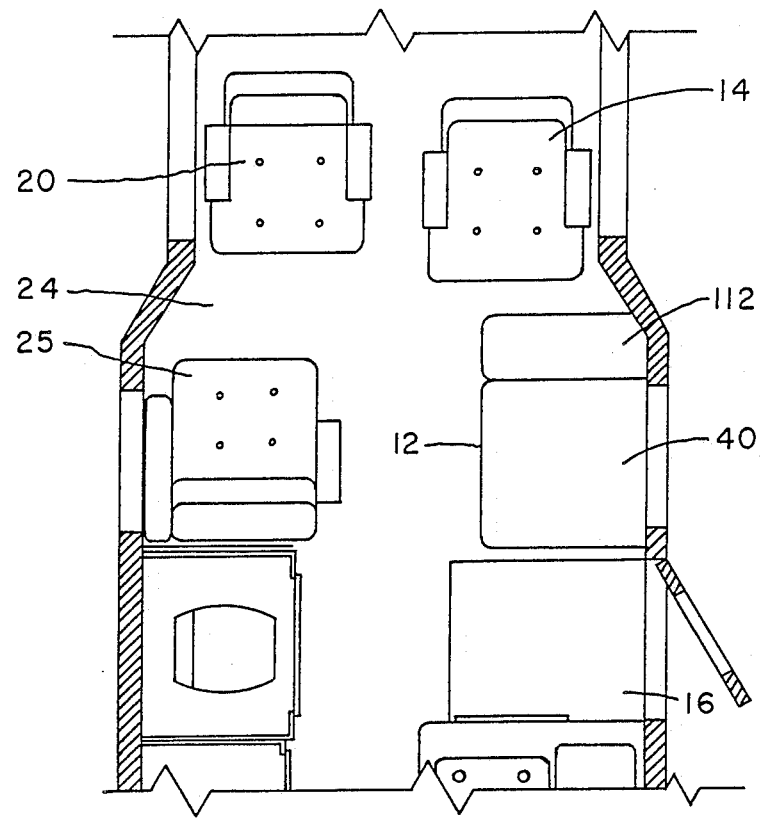
FIG. 3 corresponds to FIG. 2, but shows the front passenger seat reversed and an auxiliary table leaf extended from the cabinet toward that seat.
Figure 11:
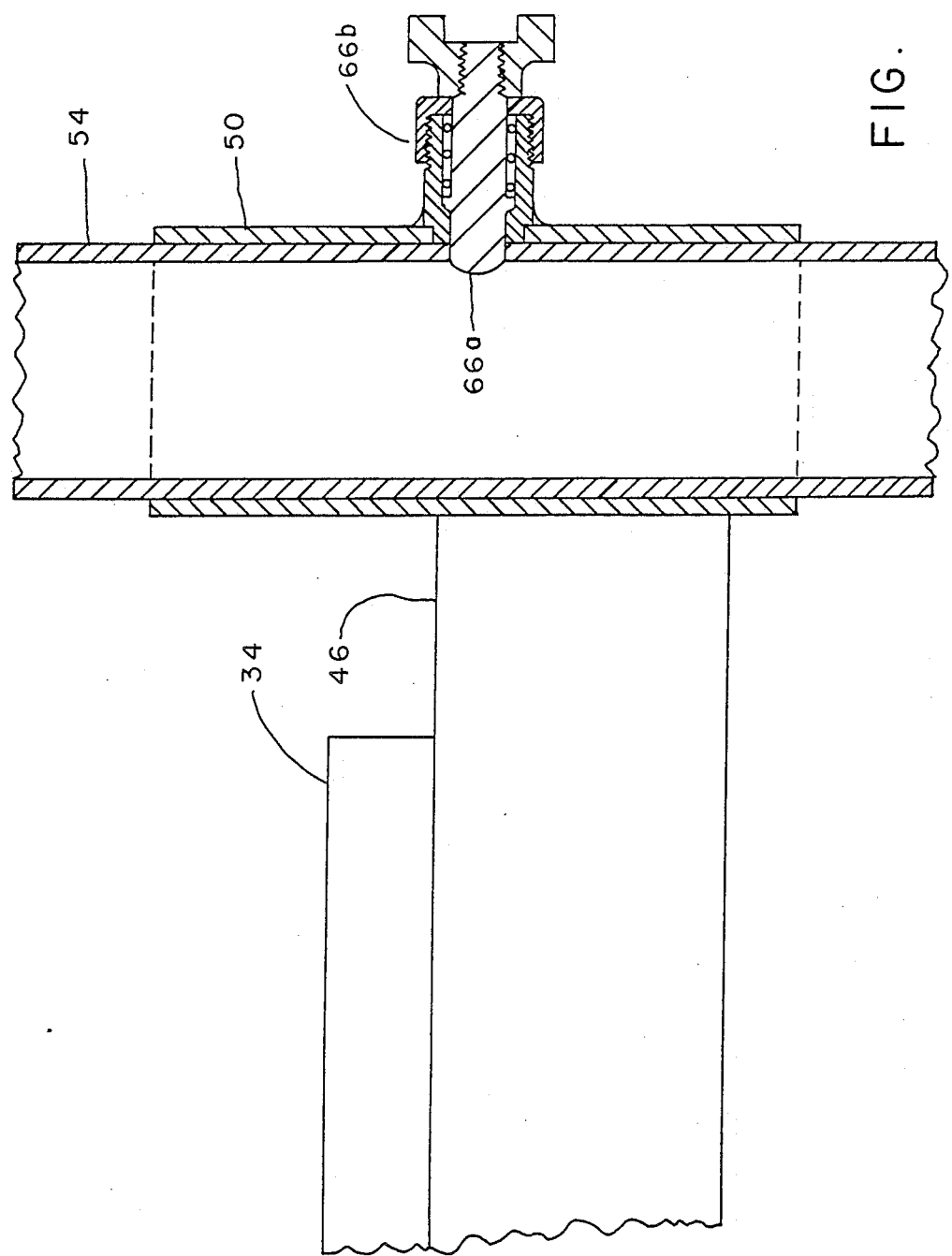
FIG. 11 shows an enlarged, broken away and partially sectional view of a locking pin to hold a seat in place.

As shown in FIGS. 3 and 11, the front passenger seat 14 may be reversed to face cabinet 12, and an additional leaf 112 may be attached by hinge 113 to the adjacent side edge of tabletop 38 to provide a convenient working surface for the occupant of seat 14 when leaf 112 is swung up to a horizontal position. It may be supported there by a conventional telescoping support 114 secured between leaf 112 and upper post section 62. Leaf 112 can be useful for a passenger during travel, or for any extra person while stopping to eat.

Cabinet 12 needs to be strongly anchored to the floor when seats 34 and 36 are in use. Four vertical bolt holes are conventionally provided in the floor of vehicle 10 beneath the position of cabinet 12, and these receive and hold four bolts 116 whose heads 118 lock down on a pair of spaced parallel channel members 104 which extend from front to back of the bottom of the cabinet, between and secured to the cross members 76b along the front and back of the cabinet. Two of the bolts go through each of the channel members, and this has proved satisfactory for the purpose.

The tops of post sections 62, 64, 70a and 72a are secured to the bottom of table top 38, and the lower ends of lower post sections 58, 60, 70b, and 72b rest on the floor of vehicle 10.

While methods and apparatus of practicing the invention have been illustrated and described, it will be understood that the invention is not limited thereto, but rather by the scope of the following claims.

I claim:

1. A cabinet comprising a pair of front vertical corner posts, a pair of rear vertical corner posts, each of the front and rear posts having upper and lower sections, and each of the front posts also having an intermediate section between and rotatable relative to its upper and lower sections, means extending through each intermediate section and into the upper and lower sections of the same post to connect the sections and support the intermediate section for said rotation, a pair of seats, and means extending from each intermediate section to connect with and support one of said seats, each of said seats and its supporting means being rotatable with the intermediate section from which the supporting mean extends, between a retracted position in which the seat is inside the cabinet and an extended position outside the cabinet where the seat can be used for seating next to the cabinet.

2. A cabinet according to claim 1, in which the means connecting the upper, intermediate and lower sections of each front post permits lifting the upper section away from the lower section, and comprising means detachably connecting the upper and lower sections of each rear post and permitting the upper section to be lifted away from the lower section, the upper portion of the cabinet comprising the upper sections of the front and rear posts being liftable away from the lower portion of the cabinet comprising the lower sections of the front and rear posts.

3. A cabinet according to claim 1, comprising a fixed horizontal top member providing a fixed table surface, a table leaf adapted to move between a retracted position overlying said fixed surface and an extended position projecting outwardly from the front of the cabinet.

4. A cabinet according to claim 3, comprising a hinged connection between the fixed top and the table leaf so that the table leaf swings up and over between its said positions.

5. A cabinet according to claim 4, comprising means slidable outwardly from beneath the fixed top to support the extended table leaf.

6. A cabinet according to claim 3, comprising a second table leaf, a hinged connection between the second table leaf and a side of the fixed top which extends between the front and rear of the cabinet, said second table leaf being swingable from an extended horizontal position for use as an extended table surface and a retracted position hanging alongside the cabinet, and a releasable means to hold the second table leaf in said extended position.

7. A cabinet according to claim 1, in which said seats are mounted at sufficiently different levels to permit parts of them to overlap within the cabinet.

8. A cabinet according to claim 3, in which said seats are moveable to positions at least partially beneath the table leaf when projecting outwardly from the front of the cabinet.

9. A cabinet according to claim 1, comprising an upper compartment connected to the upper front and rear post sections and a lower compartment connected to the lower front and rear post sections, said compartments being separated by a space into and out of which said seats and the supporting means extending to them are moveable.

10. A cabinet according to claim 9, comprising an upper access panel providing entry to the front of the upper compartment, and a lower access panel providing entry to the front of the lower compartment, hinge means between each of the compartments and the lower edge of its access panel, and means attached to the upper access panel to stop its swing downward when it reaches a horizontal position.

11. A cabinet according to claim 10, comprising readily releasable and more positively lockable means for holding each of the access panels in its closed position.

12. A cabinet according to claim 1, comprising releasable means to prevent rotation of an intermediate section of a front post relative to another section of the post, whereby movement of the seat carried by the intermediate section may be restrained during travel of a vehicle in which the cabinet is mounted.

13. A cabinet according to claim 1, comprising means to attach the bottom of the cabinet to the floor of a vehicle.

14. A recreation vehicle comprising a pair of seats at the front, an aisle extending behind the seats toward the rear of the vehicle, a cabinet fronting on the aisle and next to and behind one of said seats, said cabinet having a table leaf extensible across the aisle and a pair of seats retractible into the cabinet and extensible from the cabinet suitably for seating next to the extended table leaf, and means securing the cabinet to the floor of the vehicle sufficiently to support the seats while in use.

15. A recreation vehicle according to claim 14, in which the seat next to the cabinet is reversible, and the cabinet comprises a second table leaf extensible toward said reversible seat.

* * * * *